United States Patent
Desai et al.

(10) Patent No.: US 12,018,738 B2
(45) Date of Patent: Jun. 25, 2024

(54) VEHICLE DRIVELINE COMPONENT HAVING A SENSOR-LESS ELECTROMAGNETIC ACTUATOR SYSTEM

(71) Applicant: AMERICAN AXLE & MANUFACTURING, INC., Detroit, MI (US)

(72) Inventors: Tejas Desai, Troy, MI (US); Edgar B. Gostin, Jr., Sterling Heights, MI (US); Yini Chen, Utica, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 4 days.

(21) Appl. No.: 17/308,091

(22) Filed: May 5, 2021

(65) Prior Publication Data
US 2021/0388890 A1    Dec. 16, 2021

Related U.S. Application Data

(60) Provisional application No. 63/039,474, filed on Jun. 16, 2020.

(51) Int. Cl.
*F16H 48/24* (2006.01)
*B60K 23/04* (2006.01)
(Continued)

(52) U.S. Cl.
CPC .......... *F16H 48/24* (2013.01); *B60K 23/04* (2013.01); *F16H 48/08* (2013.01); *G01D 5/2013* (2013.01); *B60K 2023/046* (2013.01)

(58) Field of Classification Search
CPC ......... F16H 48/24; F16H 48/08; B60K 23/04; B60K 2023/046; B60K 17/12;
(Continued)

(56) References Cited

U.S. PATENT DOCUMENTS

| 4,950,985 A | 8/1990 | Voss et al. |
| 5,019,021 A * | 5/1991 | Janson ............... F16H 48/08 |
| | | 475/231 |

(Continued)

FOREIGN PATENT DOCUMENTS

| DE | 102008040250 A1 | 1/2010 |
| EP | 3372952 A1 | 12/2018 |
| WO | WO-2007069042 A2 * | 6/2007 ............ F16H 48/08 |

OTHER PUBLICATIONS

European Search Report dated Nov. 11, 2021, from the European Patent Office for corresponding European application No. EP 21179592.7.

*Primary Examiner* — Eman A Alkafawi
*Assistant Examiner* — Joseph O Nyamogo
(74) *Attorney, Agent, or Firm* — Reising Ethington P.C.

(57) ABSTRACT

A vehicle driveline component includes an armature disposed and moveable along a translation axis, a coil assembly having a coil, a coil driver, an oscillator circuit having a resonant circuit, and a controller. The oscillator circuit is electrically coupled to the coil such that the coil defines a portion of the resonant circuit. The oscillator circuit generates an oscillating signal having a frequency that varies based on a spacing between the armature and the coil assembly along the translation axis. The controller applies a drive signal to the coil driver to have the coil driver provide a modulating power signal to the coil to generate an electromagnetic field that causes relative motion between the coil assembly and the armature along the translation axis. The controller determines a system response characteristic related to the spacing between the armature and the coil assembly based on the oscillating signal.

18 Claims, 7 Drawing Sheets

(51) Int. Cl.
*F16H 48/08* (2006.01)
*G01D 5/20* (2006.01)

(58) Field of Classification Search
CPC .... G01D 5/2013; G01D 5/2026; H02P 25/06; H02K 7/10; H02K 7/116; H02K 41/02
See application file for complete search history.

(56) References Cited

U.S. PATENT DOCUMENTS

| | | | |
|---|---|---|---|
| 5,729,067 A | 3/1998 | Janutka | |
| 7,022,040 B2 | 4/2006 | DeGowske et al. | |
| 7,137,921 B2 | 11/2006 | DeGowske | |
| 7,211,020 B2 | 5/2007 | Gohl et al. | |
| 7,425,185 B2 | 9/2008 | Donofrio et al. | |
| 7,507,176 B2 | 3/2009 | Pinkos | |
| 7,534,187 B2 | 5/2009 | Donofrio | |
| 7,572,202 B2 | 8/2009 | Donofrio et al. | |
| 7,602,271 B2 | 10/2009 | York et al. | |
| 7,682,279 B2 | 3/2010 | Donofrio et al. | |
| 7,744,500 B2 | 6/2010 | Donofrio et al. | |
| 7,764,154 B2 | 7/2010 | York et al. | |
| 7,785,224 B2 | 8/2010 | York et al. | |
| 7,825,759 B2 | 11/2010 | York et al. | |
| 7,837,585 B2 | 11/2010 | Pinkos et al. | |
| 7,876,186 B2 | 1/2011 | York et al. | |
| 7,878,059 B2 | 2/2011 | Campbell | |
| 7,878,314 B2 | 2/2011 | Pinkos et al. | |
| 7,942,780 B2 | 5/2011 | Donofrio et al. | |
| 8,057,345 B2 | 11/2011 | Pinkos et al. | |
| 8,542,006 B2 | 9/2013 | Liu | |
| 9,151,368 B2 | 10/2015 | Downs et al. | |
| 9,333,965 B2 | 5/2016 | Marsh et al. | |
| 10,112,482 B2 | 10/2018 | Downs | |
| 2001/0043450 A1* | 11/2001 | Seale | H02N 15/00 361/160 |
| 2015/0136559 A1* | 5/2015 | Brumberger | F16D 48/064 192/84.9 |
| 2015/0337913 A1* | 11/2015 | Takaira | F16D 27/118 192/84.1 |
| 2016/0131206 A1* | 5/2016 | Essenmacher | F16D 41/14 701/67 |
| 2016/0258736 A1* | 9/2016 | Bachar | G01D 5/2013 |
| 2016/0301296 A1* | 10/2016 | Lalesse | H02K 49/046 |
| 2018/0067277 A1 | 3/2018 | Bang et al. | |
| 2018/0216966 A1 | 8/2018 | Suntharalingam | |

\* cited by examiner

_Fig-1_

_Fig-2_

VEHICLE DRIVELINE COMPONENT HAVING A SENSOR-LESS ELECTROMAGNETIC ACTUATOR SYSTEM

CROSS-REFERENCE TO RELATED APPLICATIONS

This application claims the benefit of U.S. Provisional Patent Application No. 63/039,474 filed Jun. 16, 2020, the disclosure of which is incorporated by reference as if fully set forth in detail herein.

FIELD

The present disclosure relates to a vehicle driveline component having a sensor-less electromagnetic actuator system.

BACKGROUND

This section provides background information related to the present disclosure which is not necessarily prior art.

Electromagnetic actuator systems are commonly employed in vehicle driveline components to effect a change in the state or mode of operation of the vehicle driveline component by generating a magnetic field that causes an axially movable member of the electromagnetic actuator system to translate. Typically, the translation of the axially movable member might cause the axially movable member (or a component that translates with or is translated by the axially movable member) to rotationally lock two or more components to one another. For example, electromagnetic actuator systems have been employed in differential assemblies to selectively couple one of the output elements of the differential assembly, such as one of a pair of side gears, to an input element of the differential assembly, such as a differential case, to cause the differential assembly to operate in a fully-locked condition in which speed differentiation between the output elements of the differential assembly is inhibited. Commonly, the axially movable element is biased into a first position by a spring (to cause the vehicle driveline component to operate in a first mode, state or condition) and electric power is provided to the electromagnetic actuator system to cause the electromagnetic actuator system to generate the electromagnetic field to move the axially movable element from the first position to a second position when it is desired to operate the vehicle driveline component in a second mode, state or condition.

It may be desirable to have the capability to determine the position of the axially movable member to permit an electronic controller to determine if the vehicle driveline component is operating in the desired mode, state or condition. In such situations, the electromagnetic actuator system will typically include one or more sensors, such as Hall-effect sensors, that generate corresponding sensor signals that are indicative of the position of the axially movable member. Such sensors are typically expensive and may additionally require some form of calibration when integrated into the vehicle driveline that correlates a magnitude of the sensor signal to a given position of the axially movable member.

SUMMARY

This section provides a general summary of the disclosure, and is not a comprehensive disclosure of its full scope or all of its features.

In one form, the present disclosure is directed to a vehicle driveline component including an armature disposed along a translation axis, a coil assembly having a coil, a coil driver electrically coupled to the coil, an oscillator circuit having a resonant circuit, and a controller coupled to the oscillator circuit and the coil driver. The armature is moveable along the translation axis. The coil driver is operable to provide a modulating power signal to the coil to generate an electromagnetic field that causes relative motion between the coil assembly and the armature along the translation axis. The oscillator circuit is electrically coupled to the coil of the coil assembly such that the coil defines a portion of the resonant circuit. The oscillator circuit is configured to generate an oscillating signal having a frequency that varies based on a spacing between the armature and the coil assembly along the translation axis. The controller is configured to apply a drive signal to the coil driver to provide the modulating power signal to the coil assembly and to determine a system response characteristic related to the spacing between the armature and the coil assembly based on the oscillating signal.

In another form, the controller is configured to apply a measurement voltage to the oscillator circuit during a measurement interval to acquire the oscillating signal.

In yet another form, the modulating power signal having alternating powered and unpowered pulses is provided at a first frequency and the measurement interval is provided at a second frequency greater than the first frequency and taken during at least one of an unpowered pulse of the modulating power signal or when the modulating power signal is not provided to coil.

In one form, the system response characteristic is indicative of an inductance of the coil and includes the frequency of the oscillating signal that varies based on the inductance, the inductance of the coil, an inductance rate of change, or a combination thereof.

In another form, the controller is configured to determine a position of the armature based on the system response characteristic and position correlation data that associates of one or more positions of the armature with a nominal system response characteristic for the one or more positions.

In yet another form, the controller is configured to change a duty cycle of the drive signal based on the determined system response characteristic.

In one form, the controller is configured to increase the duty cycle of the drive signal to increase power to the coil in response to the system response characteristic indicating that the armature is at a first position relative to the coil assembly. The controller is configured to decrease the duty cycle of the drive signal to decrease power to the coil assembly to a reduced power level in response to the system response characteristic indicating the armature is at a second position relative to the coil assembly. With the reduced power level, the armature is maintained in the second position.

In another form, the oscillator circuit is a Colpitts oscillator.

In yet another form, the vehicle driveline component further includes a differential assembly and a coupling including a first coupling member and second coupling member. The differential assembly includes a differential input member and a pair of differential output members. The first coupling member is fixedly coupled to one of the differential output members for rotation therewith about the translation axis and the second coupling member is non-rotatably and axially slidably coupled the differential input member. The second coupling member moves along the translation axis responsive to the relative motion between the coil assembly and the armature when the coil driver is operated to generate the electromagnetic field.

In one form, the coupling is a dog clutch.

In another form, the system response characteristic is indicative of an inductance of the coil and includes the frequency of the oscillating signal that varies based on the inductance, the inductance of the coil, an inductance rate of change, or a combination thereof. The controller is configured to determine a position of the coupling based on the system response characteristic and position correlation data that correlates one or more positions of the coupling as it moves between an unlocked state and a locked state with a nominal system response characteristic.

In yet another form, the frequency of the oscillating signal is related to an inductance of the coil. The controller is configured to perform a diagnostic to determine an abnormal performance of the coupling, the coil assembly, the armature, or a combination thereof based on the system response characteristic and predefined diagnostic data. The system response characteristic includes the frequency of the oscillating signal, an inductance of the coil, an inductance rate of change, or a combination thereof.

In one form, the abnormal performance is associated with a temperature, lubrication characteristic, part alignment, or a combination thereof.

In one form, the present disclosure is directed toward a method of controlling a vehicle driveline component having an armature disposed along a translation axis, a coil assembly including a coil, a coil driver electrically coupled to the coil, and an oscillator circuit. The method includes providing, by way of the coil driver, a modulating power signal to the coil of the coil assembly to generate an electromagnetic field that causes relative motion between the coil assembly and the armature along the translation axis, and selectively applying a measurement voltage to the oscillator circuit connected to the coil of the coil assembly. The oscillator circuit includes a resonant circuit and is electrically coupled to the coil of the coil assembly such that the coil defines a portion of the resonant circuit. The method further includes measuring a frequency of an oscillating signal generated by the oscillator circuit during a measurement interval. The frequency of the oscillating signal is related to an inductance of the coil and varies based on a spacing between the armature and the coil assembly along the translation axis. The method further includes determining a system response characteristic related to the spacing between the armature and the coil assembly based on the oscillating signal, and controlling power to the coil assembly based on the system response characteristic.

In another form, the controlling power to the coil assembly further includes increasing power to the coil in response to the system response characteristic indicating that the armature is at a first position relative to the coil assembly, and decreasing power to the coil in response to the system response characteristic indicating that the armature is at a second position relative to the coil assembly. The decreased power maintains the armature in the second position.

In yet another form, the modulating power signal has alternating powered and unpowered pulses and is provided at a first frequency, the measurement interval is provided at a second frequency greater than the first frequency, and the measurement interval is taken during at least one of an unpowered pulse of the modulating power signal or when the modulating power signal is not provided to the coil.

In one form, the system response characteristic is based on a measured characteristic. The measured characteristic includes the frequency of the oscillating signal, an inductance of the coil, an inductance rate of change, or a combination thereof.

In another form, the vehicle driveline component includes a differential assembly and a coupling. The differential assembly includes a differential input member and a pair of differential output members. The coupling includes a first coupling member and second coupling member. The first coupling member is fixedly coupled to one of the differential output members for rotation therewith about the translation axis and the second coupling member is non-rotatably and axially slidably coupled the differential input member. The second coupling member moves along the translation axis responsive to the relative motion between the coil assembly and the armature when the modulating power signal is provided to the coil to generate the electromagnetic field. The method further includes determining a state of the coupling as a locked state or an unlocked state based on the system response characteristic.

In yet another form, the system response characteristic is based on a measured characteristic that includes the frequency of the oscillating signal, an inductance of the coil, an inductance rate of change, or a combination thereof. The state of the coupling is determined based on predefined data that correlates one or more positions of the coupling as it moves between the unlocked state and the locked state with an associated measured frequency of the oscillating signal, an associated inductance of the coil, or an associated rate of change of inductance, or a combination thereof.

In one form, the method further includes determining a measured characteristic. The measured characteristic includes the frequency of the oscillator circuit, an inductance of the coil, an inductance rate of change, or a combination thereof. The method further includes performing a diagnostic to determine an abnormal performance of the coupling, the armature, the coil assembly, or a combination thereof based on a measured characteristic and diagnostic data. The abnormal performance is associated with a temperature, lubrication characteristic, part alignment, or a combination thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
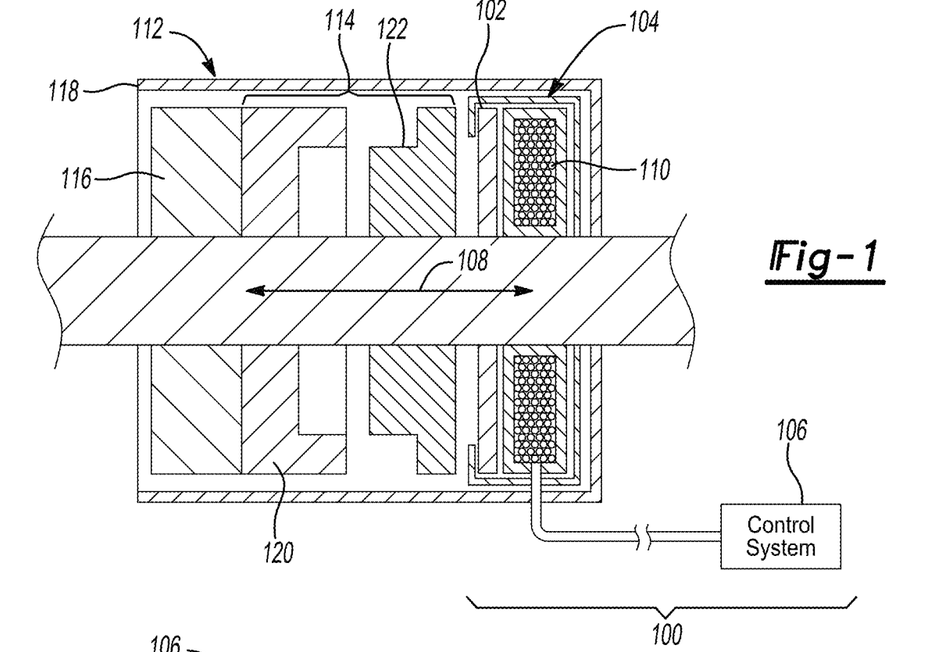
FIG. 1 is a schematic of an electromagnetic actuator system for locking a rotary gear assembly in accordance with the teachings of the present disclosure.

With reference to FIG. 1, an electromagnetic actuator (EMA) system 100 includes an armature 102, a coil assembly 104, and a control system 106. The armature 102 is disposed along a translation axis, generally represented by reference number 108, and the coil assembly 104 is operable by the control system 106 to generate an electromagnetic field that causes relative motion between the coil assembly 104 and the armature 102 along the translation axis 108.

In one form, the coil assembly 104 includes a coil 110 that is electrically coupled to the control system 106. The control system 106 applies power (e.g., a modulating power signal) to the coil 110 to generate the electromagnetic field, which causes the armature 102 to move relative to the coil assembly 104. Movement of the armature 102 relative to the coil assembly 104 changes the inductance of the coil 110. Specifically, the inductance of a coil is a function of permeability of a core material, as provided in equation 1 in which "L" is coil inductance; "N" is number of turns in wire coil; "$\mu_r$" is relative permeability of core material, which varies at different positions (e.g., $9.42 \times 10^{-4}$ to $1.19 \times 10^{-3}$); "$\mu_0$" is permeability of free space ($1.26 \times 10^{-6}$); "A" is are of coil; and "1" is length of coil. Accordingly, by monitoring the inductance of the coil 110, the movement (i.e., actuation) of the armature 102 can also be monitored.

$$L = N^2 \times \mu A \times l; \mu = \mu_r \times \mu_0 \qquad \text{Equation 1:}$$

To monitor the armature 102, the control system 106 employs an oscillator circuit that generates an oscillating signal having a frequency that varies based on an inductance of the coil 110. Specifically, the relationship between the frequency of the oscillating signal and the inductance of the coil may be represented by equation 2 in which "f" is frequency, "L" is coil inductance, and "C" is capacitance. Accordingly, movement of the armature 102 can be monitored based on the oscillating signal.

$$f = \frac{1}{2\pi\sqrt{LC}} \qquad \text{Equation 2}$$

Figure 2:
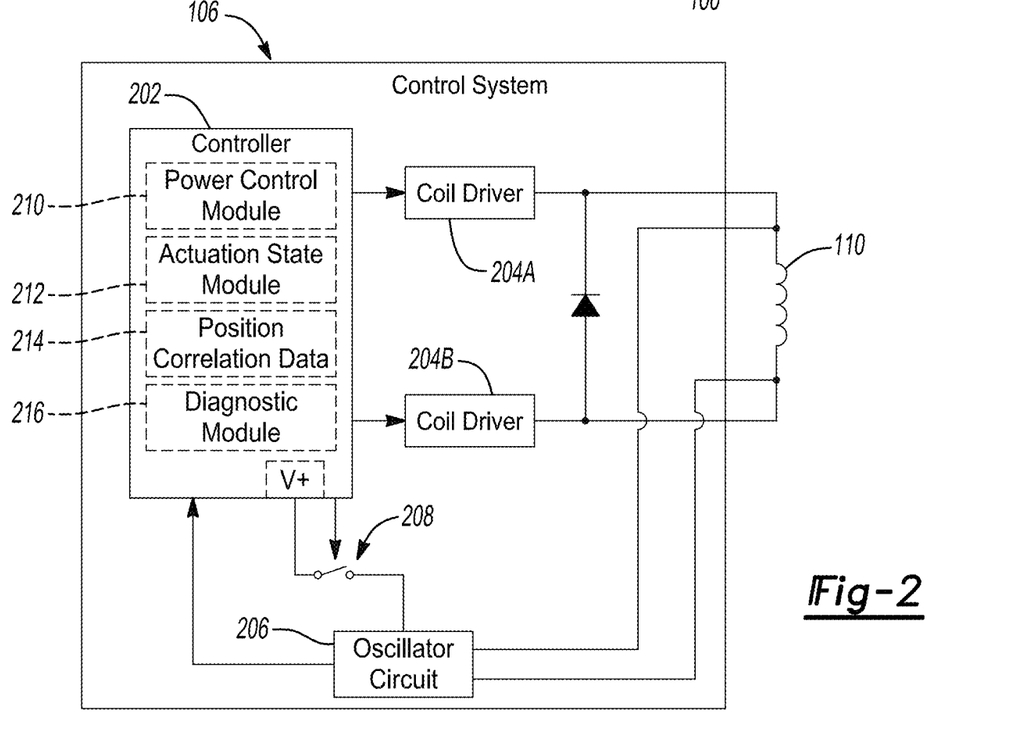
FIG. 2 is a block diagram of a control system of the electromagnetic actuator system.

In one form, referring to FIG. 2, the control system 106 is configured to include a controller 202, a pair of coil drivers 204A and 204B, and an oscillator circuit 206. The coil 110 is connected to the control system 106 to receive power and to define a portion of the oscillator circuit 206. The coil drivers 204A and 204B are provided as high and low side drivers and are operable by the controller 202 to apply a modulating power signal to the coil 110 to generate the electromagnetic field.

The oscillator circuit 206 is coupled to the controller 202 and is operable to generate an oscillating signal having a frequency that varies based on a spacing between the armature 102 and the coil assembly 104 along the translation axis 108. More particularly, the controller 202 is configured to apply a voltage signal or in other words, a measurement voltage (e.g., vehicle battery voltage; illustrated as "V+" in FIG. 2) to the oscillator circuit 206. Upon activation, the oscillator circuit 206 generates and provides the oscillating signal to the controller 202. In the following, the time period in which the oscillating signal is acquired is provided as a measurement interval.

In one form, the oscillator circuit 206 includes a resonant circuit that typically includes an inductor and one or more capacitors. Here, the inductor of the resonant circuit of the oscillator circuit 206 is the coil 110 of the coil assembly 104. For example, with reference to FIG. 3, the oscillator circuit 206 is provided as a Colpitts oscillator that includes the coil 110 (i.e., an inductor represented by "L" in FIG. 3), capacitors C1 and C2, resistors R1, R2, and R3, and a transistor Q1. Accordingly, the coil 110 of the coil assembly 104 defines a portion of the resonant circuit of the oscillator circuit 206. In the following the coil 110 is referenced as the inductor L.

Figure 3:
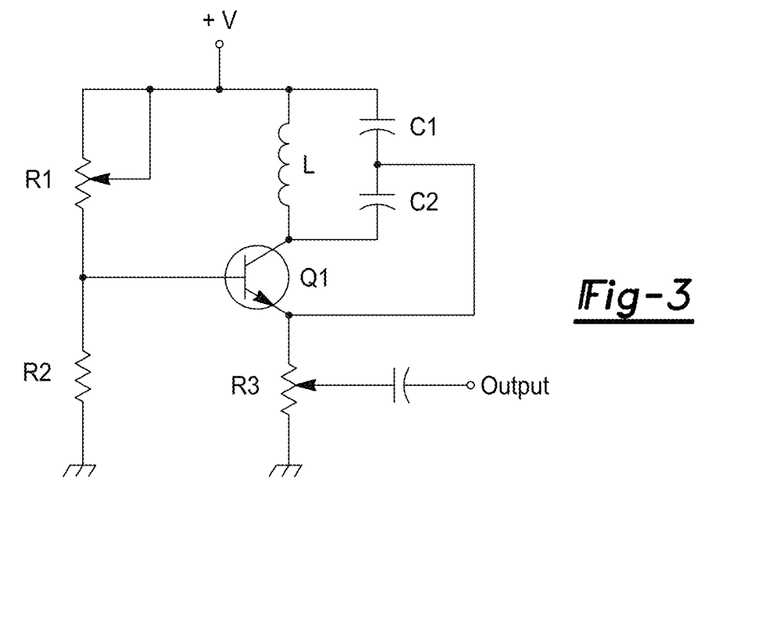
FIG. 3 is a circuit diagram of an oscillator circuit of the electromagnetic actuator system.

The inductor L and the capacitors C1 and C2 define the resonant circuit which sets the frequency of oscillation of the oscillating signal. The capacitors C1 and C2 are connected in series and are in parallel with the inductor L. In general, when power is provided to the oscillator circuit 206, the capacitors C1 and C2 charge and then discharge through the inductor L, thereby charging the inductor L. The charged inductor L then discharges through the capacitors C1 and C2. The cyclic charging and discharging of energy cause harmonic oscillation in the resonant circuit. The capacitors C1 and C2 define a voltage divider to provide a tapped capacitance as a source of feedback to the transistor Q1, which operates as a gain device to amplify the harmonic oscillation. The two capacitors C1 and C2, in series produce a 180° phase shift which is inverted by another 180° to produce the required positive feedback. The oscillation frequency which is pure sine-wave voltage is determined by the resonance frequency of the tank circuit. With C1 and C2 being fixed values, the frequency of the oscillating signal varies based on the inductance of the coil 110. For example, the frequency can be calculated using equation 3 in which "L" is inductance of the coil 110, "C1" is the capacitance of C1 and "C2" is the capacitance of C2.

$$f = \frac{1}{2\pi\sqrt{L\frac{C1 \times C2}{C1 + C2}}} \qquad \text{Equation 3}$$

Various factors are considered when selecting the capacitance of the resonant circuit such as, but not limited to, selecting a capacitance that is high enough to inhibit or reduce the contribution parasitic capacitances has on the error of the EMA system 100 such that the frequency of oscillation is detectable by the controller 202 (i.e., measurement sample interval is based on the combination of logic execution and available controller 202 base clock), but also allows for precision when comparing the overall contributors to frequency error as well as smallest measurement step size capability of the system 100 and without interruption of coil normal operation (i.e., sufficient oscillation cycles must be completed within the "off time" of the coil energizing pulses). Furthermore, the capacitance should provide a peak-to-peak voltage (Vpp) of the oscillating signal received by the controller 202 that is detectable, such as between 0.5-4.5V. The frequency of the oscillator circuit 206 may be referenced as an actuator frequency to distinguish from other frequencies described herein. Many other factors may also be considered, such as available matching coil inductances, packaging environment, and/or tolerances, among others.

While the oscillator circuit 206 is provided as a Colpitts circuit, other types of oscillators having a resonant circuit can be used and should not be limited to the circuit illustrated in FIG. 3. In addition, modifications may be made to the Colpitts circuit of FIG. 3 while remaining within the scope of the present disclosure. For example, in lieu of the transistor Q1, which is a bipolar junction transistor, other types of gain devices may be used such as, but not limited to, an operational amplifier or field effect transistor.

In an exemplary application, the EMA system 100 of the present disclosure may be a component of a vehicle driveline system. For example, with continuing reference to FIG. 1, the EMA system 100 is provided with a rotary gear assembly 112 and a coupling 114 to axially move the coupling 114 to rotationally lock to two or more component of the rotary gear assembly 112 to one another. For example, the rotary gear assembly may be a differential assembly that includes a pair of output elements (only one output element 116 is illustrated), such as side gears, and an input element 118 (e.g., differential case). For ease of explanation, the configuration of these components is simplified in FIG. 1, but a more detail representation and description is provided below in association with FIGS. 6-9.

The coupling 114 includes a non-sliding member 120 (i.e., a first coupling member) and a slidable member 122 (i.e., a second coupling member). The non-sliding member 120 is fixedly coupled to the output element 116 and rotates with the output element 116 about the translation axis 108. The slidable member 122 is non-rotatable and is axially slidably coupled to the input element 118. That is, the slidable member 122 is moveable along the translation axis 108 to engage (i.e., lock) and disengage (i.e., unlock) with the non-sliding member 120.

Specifically, in response to the electromagnetic field and the relative motion between the coil assembly 104 and the armature 102, the slidable member 122 is configured to slide or move along the translation axis 108 and engage with the non-sliding member 120 to lock the output element 116 and the input element 118 such that speed differentiation between the output elements of the differential assembly is inhibited. When the electromagnetic field is removed, the slidable member 122 disengages with the non-sliding member 120 with the assistance of a spring (not shown), and thus, unlocks the output element 116 and the input element 118 to permit speed differentiation between the output element.

Since the electromagnetic field causes the translational movement of the armature 102 to place the coupling 114 in the locked state, the change in inductance of the coil 110 may be further associated with the movement of the coupling 114 to determine if the coupling 114 is in the locked state (i.e., a first state) or the unlocked state (i.e., a second state). Specifically, in one form, the position of the armature 102 and thus, the coupling 114 is monitored based on a system response characteristic that may include a frequency of the oscillating signal, an inductance of the coil 110, which is calculated using the frequency, and/or a rate of change of inductance that can be defined using multiple actuator frequency measurements. For example, in one form, the rate of change of inductance of the coil 110 may be used to determine the position of the coupling 114 and the amount of power to provide the coil 110 to have the coupling 114 move to and subsequently maintained at the locked state. As such, the relationship between inductance and position of the armature 102/coupling 114 is further used to verify whether the coupling 114 is in the unlocked state.

In the following, with no electromagnetic field, the position of the armature 102 may be referred to as a rest position or unlocked position to coincide with the unlock state of the coupling 114. With the electromagnetic field, the position of the armature 102, when it is extended to move the coupling 114 to the locked state, is referred to as an actuated position or locked position.

With continuing reference to FIG. 2, the controller 202 is configured as a closed-loop control for controlling the EMA system 100 to lock/unlock the rotary gear assembly 112. In one form, the controller 202 controls actuation of the armature 102 and thus, the coupling 114 based on a signal from, for example, a vehicle system controller (not shown) that controls operation of a system having the rotary gear assembly 112 and the EMA system 100. The controller 202 and the vehicle system controller may communicate via a vehicle communication network such as controller area network (CAN) or other suitable vehicle network.

The controller 202 includes hardware components such as a microprocessor and memory for storing software programs executable by the microprocessor to perform the functions described herein. More particularly, the controller 202 is configured to operate as a power control module 210, an actuation state module 212 for determining a position of the armature 102 and/or the coupling 114 based on predefined position correlation data 214, and a diagnostic module 216.

The power control module 210 controls power to the coil 110 to lock the rotary gear assembly 112 by operating the coil drivers 204A and 204B. In one form, the power control module 210 applies a drive signal that is a pulse width modulated (PWM) signal to the coil drivers 204A and 204B to have the coil drivers 204A and 204B provide power to the coil 110. The power control module 210 may adjust the amount of power to the coil 110 by modifying a duty cycle of the drive signal based on the system response characteristic and more particularly, a position of the coupling 114. For example, when placing the coupling 114 in the locked state, the power control module 210 may increase power to the coil 110 by increasing the duty cycle if the coupling 114 is in the unlocked state after power is initially applied. Generally, the amount of power needed to build current in the coil 110 and move the coupling 114 from the unlocked state to the locked state is generally more than the amount of power needed to maintain the coupling 114 in the locked state. Accordingly, to reduce time needed to lock the rotary gear assembly 112, the power control module 210 may initially increase power to the coil 110 and once in the locked position, reduce power to the coil 110 while maintaining the coupling 114 in the locked state. In one form, the power control module 210 may inclemently increase/decrease the power to the coil 110 by a predefined amount to lock and then maintain the lock state of the rotary gear assembly 112.

The actuation state module 212 is configured to determine the system response characteristic based on the oscillating signal and further determine a position or a state of the coupling 114. Specifically, during the measurement interval, the actuation state module 212 activates the oscillator circuit 206 as provided above and to receive the oscillating signal and measure the actuator frequency of the oscillating signal. The measurement interval is performed at a frequency that is greater than that of the drive signal or in other words, the modulating power signal to the coil 110. For example, the modulating power signal may have a frequency of 300 Hz, while the frequency at which the measurement interval is provided is 10-300 kHz. In addition, with the modulating power signal having alternating powered and unpowered pulse, the measurement interval is further provided during unpowered pulse in which no power is provided to the coil 110. Accordingly, the controller 202 is able to acquire multiple actuator frequency measurements for monitoring the position of the coupling 114. It should be readily understood, that a measurement interval may also be provided when the coupling is to be unlocked to determine whether the position of the coupling 114 is indeed unlocked and/or to gather data regarding the EMA system 100.

In one form, the system response characteristic includes, but is not limited to: the measured actuator frequency; an inductance of the coil 110, which is calculated using the measured actuator frequency and predefined algorithms; and/or a rate of change of inductance that can be defined using multiple actuator frequency measurements. The actuation state module 212 is configured to determine a posture of the coupling 114 based on the system response characteristic and the position correlation data 214. The posture may be provided as a state (locked/unlocked), a position, an actuation percentage indicative of the amount of movement travelled by the coupling 114 over total distance to be travelled, and/or other suitable parameter for capture motion/placement of the coupling 114.

In one form, the position correlation data 214 is predefined data used for determining the posture of the coupling 114 and associates a nominal system response characteristic with a respective posture of the coupling 114. The position correlation data is determined via experimentation and may be a setpoint value, a look-up table, algorithm, a computational model, and/or a statistical relationship, among others.

Figure 4:
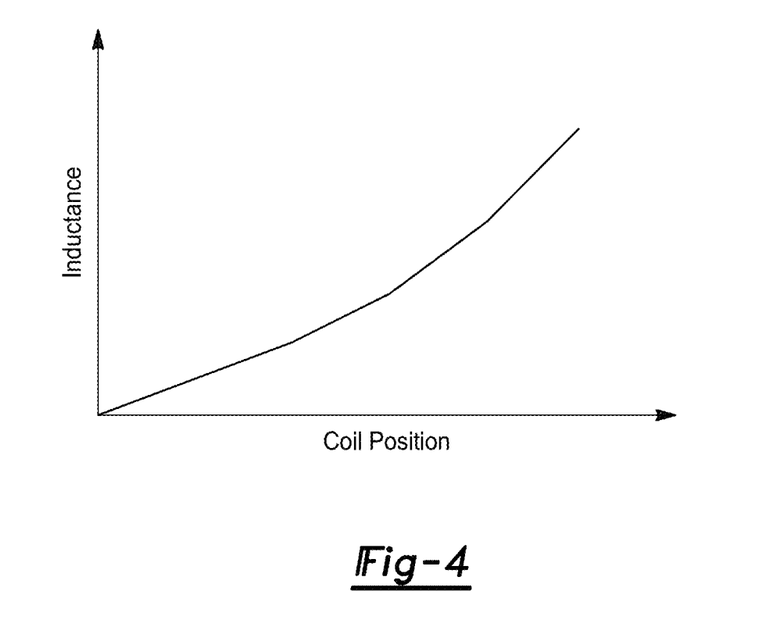
FIG. 4 is a graph illustrating a rate of change of inductance versus position of a coupling.

For example, the position correlation data may define an inductance setpoint indicative of when the coupling 114 is provided in a locked state and/or an unlocked state. In another example, the position correlation data may correlate an inductance rate of change of the coil 110 with movement of the coupling 114 as it translates between the unlocked and locked states (i.e., unlocked to locked and locked to unlock). With reference to FIG. 4, a graph illustrating an exemplary relationship between inductance and position is provided. As illustrated, the inductance of the coil changes with the position of the coil or in other words, the coupling 114.

In one form, the posture of the coupling 114 is provided as feedback data that is used to adjust power to the coil assembly 104 as described above with respect to the power control module 210. Accordingly, the controller 202 is configured to boost power to the coil 110 when activating the locked state rotary and reduce power (i.e., decrease power to a reduced power level) while maintaining the lock state.

While specific examples are provided for the position correlation data, the position correlation data may be defined in various suitable ways and should not be limited to the examples provided herein. In addition, while the actuation state module 212 is described as determining a posture of the coupling 114, it should be readily understood that the posture of the coupling 114 is reflective of the position/movement of the armature 102. Thus, the position correlation data may be defined in relation to a posture of the armature 102.

The diagnostic module 216 is configured to diagnose an abnormal performance of the EMA system 100 and/or the coupling 114 based on the system response characteristic(s). Specifically, the EMA system 100 and the coupling 109 may experience irregular operation or begin to experience wear which can cause the system response characteristic(s) to deviate from nominal measurements. For example, over time, oil used in the coupling 114 may become contaminated causing a slower movement to the locked state than with uncontaminated oil. In another example, the slidable member 122 and the non-sliding member 120 of the coupling 114 may be misaligned and thus, require rotational movement of vehicle tires. The system response characteristic(s) permits separation of the change in position of the coupling 114 from other influences, such as temperature, part variation, and/or aging of components, among others. The diagnostic module 216 is configured to detect abnormal performances with respect to these other influences.

Specifically, through controlled experiments and modeling techniques, one or more abnormal performances may be associated with system response characteristic(s) reflective of the behavior of the EMA system 100 during the abnormality. The associated data is provided as diagnostic data and stored by the diagnostic module 216. In one form, the diagnostic module 216 determines whether the EMA system 100 and/or coupling 114 is experiencing an abnormal performance based on system response characteristic(s) and the diagnostic data. For example, the diagnostic data associates the rate of change of inductance with the quality of oil provided within the coupling 114. Thus, when the rate of change of inductance begins to deviate and is similar to that provided in the diagnostic data, the diagnostic module 216 may determine that the oil is contaminated. In another example, the diagnostic module 216 analyzes the actuator frequency to determine characteristics of the oscillation such as startup time, decay, frequency deviation, and/or frequency jitter, among others. Using the diagnostic data, the diagnostic module 216 may then determine characteristics of the coil 110, such as resistance, and by tracking the resistance over time, determine the temperature of the coil 110. If the temperature exceeds a setpoint, the diagnostic module 216 may issue an alert. In another example, mechanical wear of the moving mechanism (e.g., coupling 114) may be detected by analysis of measurements taken over time. For example, the time to engage the coupling 114 for a given temperature and excitation energy may be tracked and analyzed. The more time it takes to engage the coupling 114 with the same energy and at the same temperature, may indicative excessive binding possibly caused by wear of a system having the coupling 114 and EMA system 100. The battery voltage may also be employed as part of the control algorithm to determine the amount of energy used to excite the coil 110 to provide engagement without excessive waste of energy.

In one form, the diagnoses determined by the diagnostic module 216 may be provided to the primary controller for further action such as a notification to a user. While specific examples are provided the diagnostic module 216 may be configured to monitor and/or detect various types of operational states and should not be limited to those described herein.

While the controller 202 is described as having a diagnostic module 216, in one variation, the diagnostic module 216 may be omitted from the controller 202. In another variation, the diagnostic module 216 may be incorporated as part of, for example, the vehicle system controller or a vehicle diagnostic controller.

Figure 5:
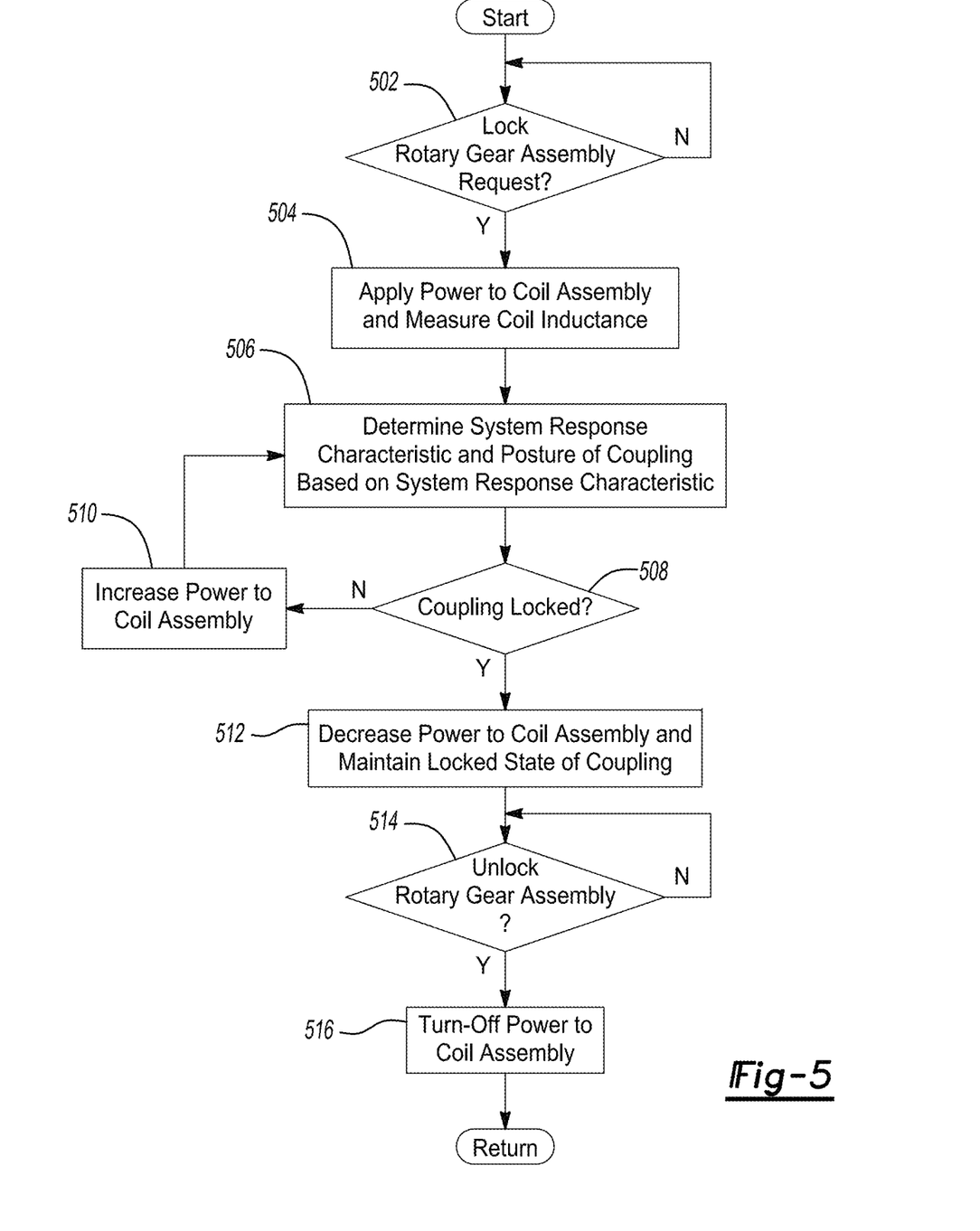
FIG. 5 is a flowchart of a control routine for the electromagnetic actuator system to lock the rotary gear assembly.

With reference to FIG. 5, an example control routine 500 performed by the EMA system 100 is provided. The routine 500 is described as if the EMA system 100 is provided in a vehicle for controlling a locking differential system. However, the routine 500 should not be limited to such application and is applicable to other applications.

The routine 500 may begin when the vehicle receives power and is in a drive state, and at 502, the EMA system 100 determines if a request for locking the rotary gear assembly (i.e., differential assembly) by a coupling is received. As provided above, the EMA system 100 may receive a request (e.g., command signal) from the vehicle system controller instructing the EMA system 100 to lock the differential. Thus, when the command signal is received, the EMA system 100, at 504, applies power to the coil assembly and measures coil inductance based on actuator frequency of the oscillating signal, as provided above. In one form, throughout the routine, the EMA system 100 provides power to the coil assembly and measures the actuator frequency during the measurement interval.

At 506, the EMA system 100 determines a system response characteristic and then a posture of the coupling based on the system response characteristic. For example, using the actuator frequency, the EMA system 100 determines one or more system response characteristic and determines the posture of the coupling using the position correlation data. At 508, the EMA system 100 determines if the coupling is in the locked state. If not, the EMA system 100 increases power to the coil assembly, as provided above, at 510. If in the locked state, the EMA system 100 decreases power to the coil assembly while maintaining the coupling in the locked state, at 512. As provided above, in one form, the increase and decrease in power can be incremental or based on a predefined algorithm.

At 514, the EMA system 100 determines if the rotary gear assembly should be unlocked. Similar to a command signal indicating a lock command, the vehicle system controller may transmit an unlock command to the EMA system 100. Once the unlock command is received, the EMA system 100 turns off power to the coil assembly, at 516. While not illustrated, the EMA system 100 may measure the actuator frequency to determine if the coupling 114 is in the unlocked state, and thus, can verify disengagement. If the coupling 114 is not unlocked state, the EMA system 100 may notify the vehicle system controller.

FIG. 5 is just one example routine for the EMA system 100 of the present disclosure. It should be readily understood that the EMA system 100 may be configured in various suitable ways for performing the operation described herein.

Figure 6:
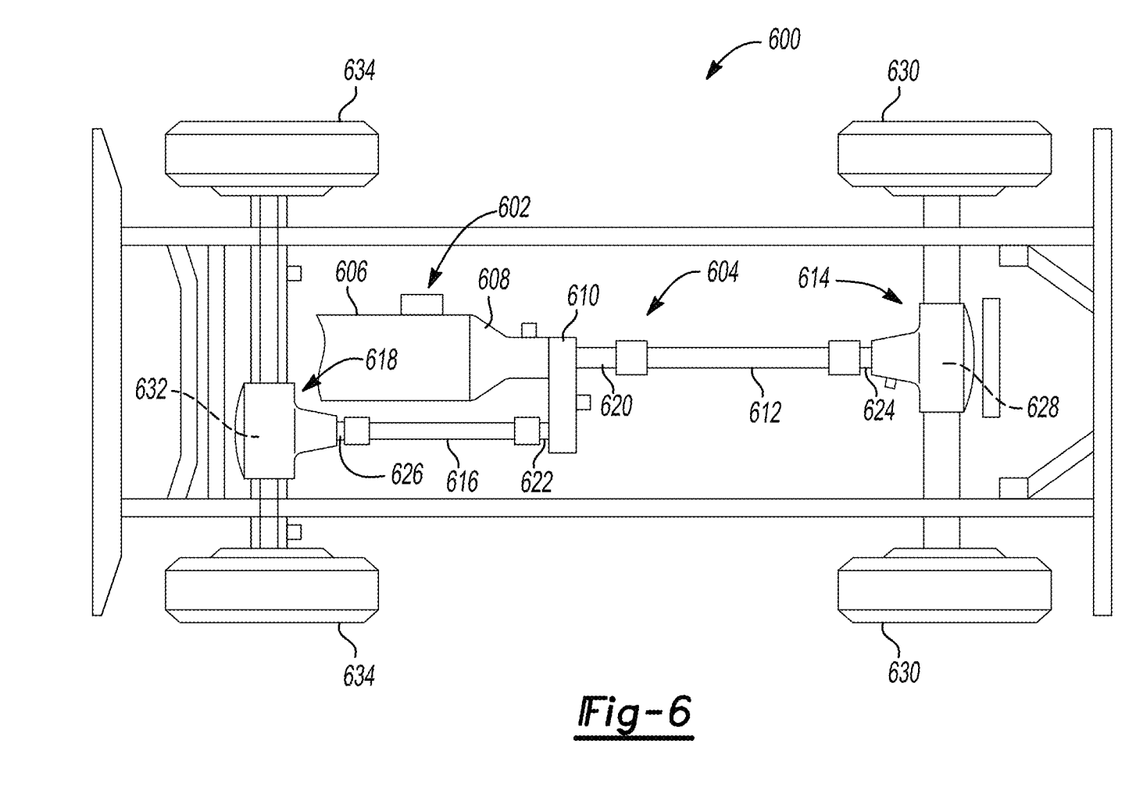
FIG. 6 is a schematic illustration of a vehicle having a driveline constructed in accordance with the teachings of the present disclosure

With reference to FIGS. 6 to 9, an example application of the EMA system of the present disclosure is provided in relation to a locking differential assembly for a vehicle driveline system. Referring to FIG. 6, an exemplary vehicle 600 is schematically shown and may include a powertrain 602 and a driveline 604. The powertrain 602 includes a power source, such as an internal combustion engine 606 and a transmission 608 that receives rotary power from the engine 606 and outputs power to the driveline 604. The driveline 604 includes a transfer case 610, a rear propeller shaft 612, a rear axle assembly 614, a front propeller shaft 616, and a front axle assembly 618. The transfer case 610 transmits drive torque from the transmission 608 to the rear and front axle assemblies 614 and 618. The transfer case 610 includes an input shaft (not specifically shown), which is coupled to the transmission 608 to receive rotary power therefrom, a rear output shaft 620, which is coupled to the rear propeller shaft 612, and a front output shaft 622 that is coupled to the front propeller shaft 616. The rear propeller shaft 612 transmits rotary power from the rear output shaft 30 to an input pinion 624 of the rear axle assembly 614. The front propeller shaft 616 transmits rotary power from the front output shaft 622 to an input pinion 626 of the front axle assembly 618. The rear axle assembly 614 includes a differential assembly 628 that is driven by the input pinion 624 and outputs rotary power to drive a pair of rear vehicle wheels 630. Similarly, the front axle assembly 618 includes a differential assembly 632 that is driven by the input pinion 626 and outputs rotary power to drive a pair of front vehicle wheels 634.

The front and rear axle assemblies 614 and 618 may be similar in their construction and operation and as such, only the rear axle assembly 614 will be discussed in detail herein. With additional reference to FIG. 7, the rear axle assembly 614 includes an axle housing 700, the differential assembly 628, and a pair of axle shafts 704 (only one of which is specifically shown). The axle housing 700 may be conventionally configured to include a housing structure 706 and a pair of bearing caps 708 that can be fixedly but removably coupled to the housing structure 706. The housing structure 706 can define a differential cavity 710 that houses the differential assembly 628. The bearing caps 708 can be decoupled from the housing structure 706 to permit the differential assembly 628 to be received within the differential cavity 710. The axle shafts 704 is coupled to opposite sides of the differential assembly 628 and to respective ones of the rear vehicle wheels 630.

Figure 7:
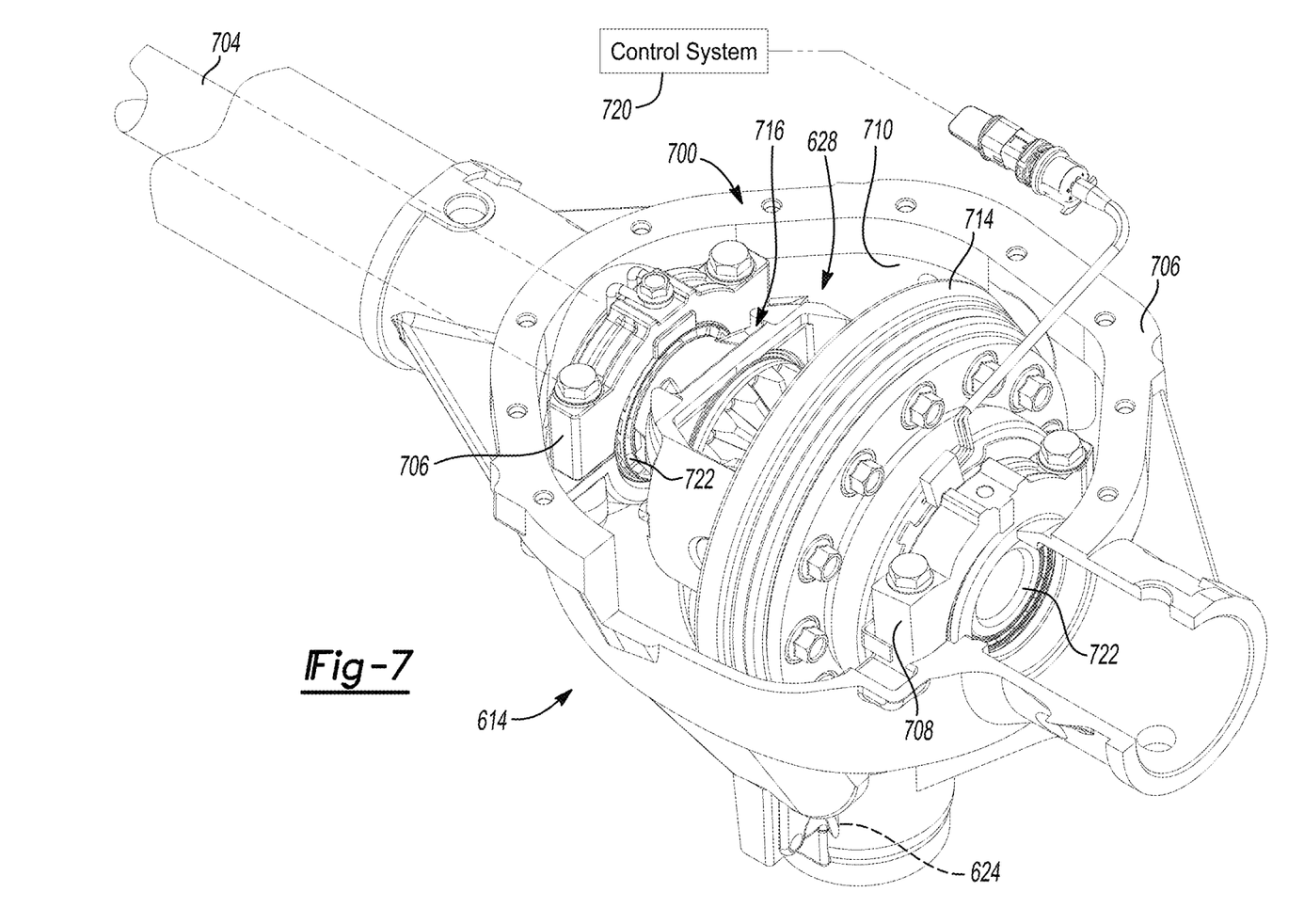
FIG. 7 is a partially broken away perspective view of a portion of the vehicle of FIG. 6, illustrating the rear axle assembly in more detail.

In one form, the differential assembly 628 includes a differential case 712, a ring gear 714, a gear set 716, an electromagnetic actuator (EMA) system 718 having a control system 720, and the input pinion 626. The control system 720 is configured in a similar manner as the control system 106 to lock and unlock the gear set 716, and thus, for purposes of brevity, details regarding the control system 720 is omitted.

Generally, the input pinion 626 is coupled the axle housing 700 via a set of bearings (not shown) and disposed about a rotational axis that is generally perpendicular to a rotational axis of the differential case 712. The input pinion 626 includes a plurality of pinion teeth (not shown) that are meshingly engaged to a plurality of ring gear teeth (not shown) formed on the ring gear 714. In one form, the differential case 712 may be mounted to the axle housing 700 via bearings 722 for rotation within the differential cavity 710 about the aforementioned rotational axis.

Figure 8:
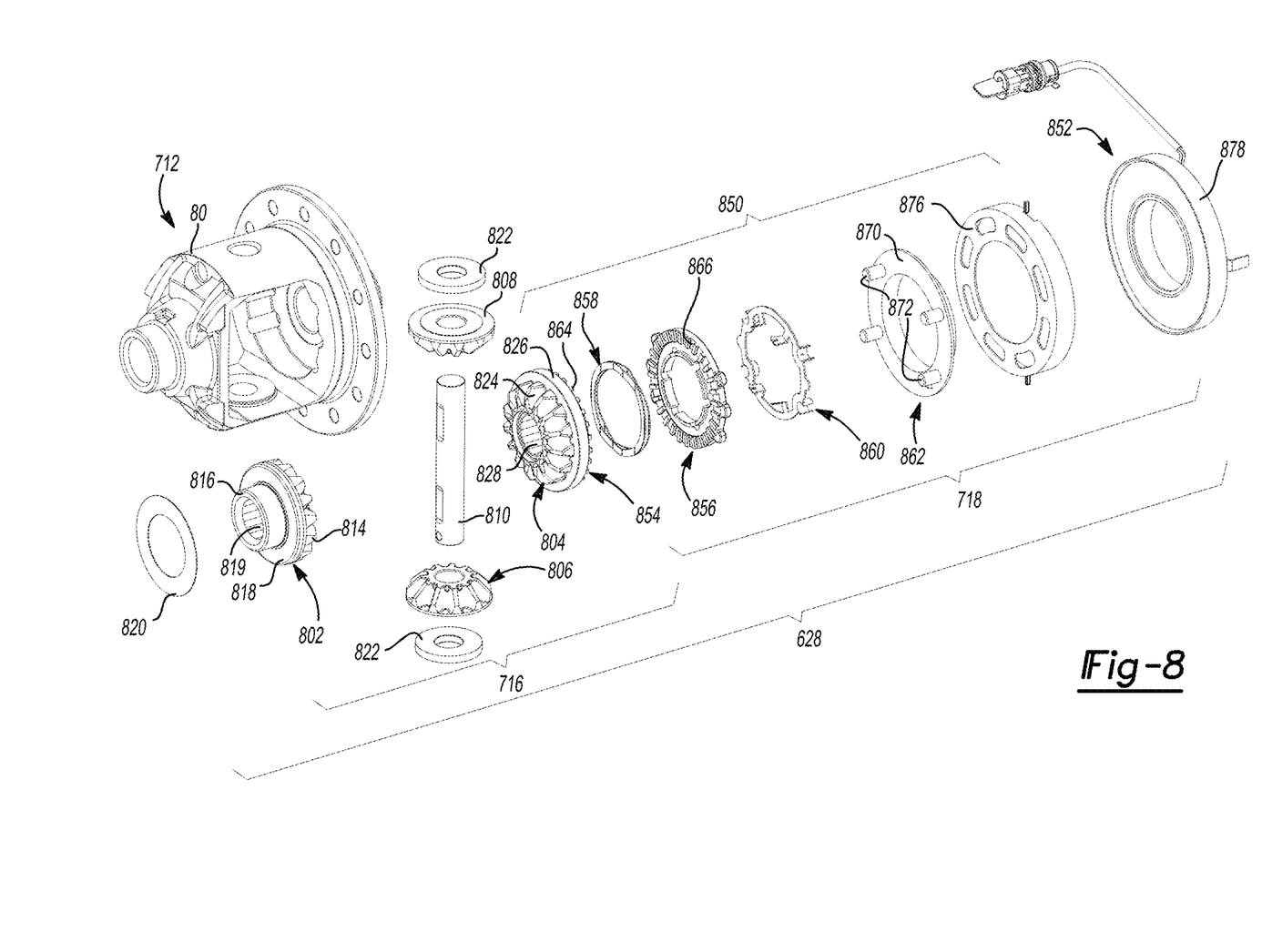
FIG. 8 is an exploded perspective view of a portion of the rear axle assembly, illustrating a differential assembly in more detail.

With reference to FIG. 8, in one form, the gear set 716 includes first and second side gears 802 and 804, respectively, first and second pinion gears 806 and 808, respectively, and a cross-shaft 810. The first side gear 802 includes an annular gear portion 814, which can have a plurality of gear teeth, an annular hub portion 816, which intersects the gear portion 814 at a flange face 818, and a splined aperture 819 that can engage a mating splined segment (not shown) formed on a corresponding one of the axle shafts 704. A thrust washer 820 is disposed over the hub portion 816 and abuts the flange face 818. Washer-like spacers 822 may be employed to control the lash between the first and second pinion gears 806 and 808 and the first and second side gears 802 and 804. The second side gear 804 may include a gear portion 824 having a plurality of gear teeth, a tubular hub portion 826, and a splined aperture 828. The tubular hub portion 826 axially extends from the second side gear 804 in a direction opposite the gear portion 824. Additional details regarding a gear set for a differential assembly similar to the one provided herein is provided in U.S. Pat. No. 7,572,202, which is commonly owned with the present application and the contents of which are incorporated herein by reference in its entirety.

The locking differential assembly employs a coupling 850 that is actuated by the EMA system 718 having a coil assembly 852 to lock the gear set 716 of the differential assembly 628. In one form, the coupling 850 is provided as dog clutch that includes a first dog ring 854, a second dog ring 856, a return spring 858, a spacer ring 860, and a thrust plate 862. As the non-sliding member (or first coupling member), the first dog ring 854 is coupled (e.g., integrally formed) with the second side gear 804 on a portion thereof opposite the gear portion 824. The first dog ring 854 includes a plurality of circumferentially spaced apart radially extending teeth 864. As the slidable member, the second dog ring 856 is configured to be non-rotatably coupled to the differential case 712 but axially moveable relative to the differential case 712 along the rotational axis of the differential case 712. In one form, the second dog ring 856 includes a plurality of teeth 866 that are configured to matingly engage the teeth 864 of the first dog ring 240.

The return spring 858 may be any appropriate spring and can bias the first and second dog rings 854 and 856 apart from one another. Accordingly, when the electromagnetic field is turned-off, the second dog ring 856 will move to the unlock state. The spacer ring 860 may be unitarily formed from a suitable material, such as a polymer, which can be non-magnetic. In one form, the spacer ring 860 is configured to couple to the second dog ring 856 and the thrust plate 862.

In one form, the thrust plate 862 can include a plate portion 870 and a plurality of leg members 872. The thrust plate 862 can be unitarily formed of an appropriate material, such as a polymer. The leg members 872 are coupled to either the second dog ring 856 or the spacer ring 860, and to the coil assembly 852. The thrust plate is further adapted to engage with a portion of the differential case 712 via the leg members 872. It should be readily understood that the coupling may be configured in various suitable ways and should not be limited to a dog clutch.

In one form, the EMA system 718 includes an armature 920 (FIG. 9) that is moveable to actuate the dog clutch in response to an electromagnetic field generated by the coil assembly 852. More particularly, the coil assembly 852 operates in a similar manner as the coil assembly 104 and may be a linear actuator having a plunger 876 and a solenoid 878 that can be selectively activated to move the second dog ring 856 to the lock state via the plunger 876 and the armature 920, as provided further herein. In one form, the coil assembly 852 and the armature 920 may be configured in a similar manner as an actuator assembly provided in U.S. Pat. No. 7,602,271, which is commonly owned with the present application and the contents of which are incorporated herein by reference in its entirety. It should be noted that the actuator assembly of the referenced patent is configured to house a sensor. Such configuration is not needed for the coil assembly 852 and the armature 920, which is part of the EMA system of the present disclosure, a sensor-less EMA system.

Figure 9:
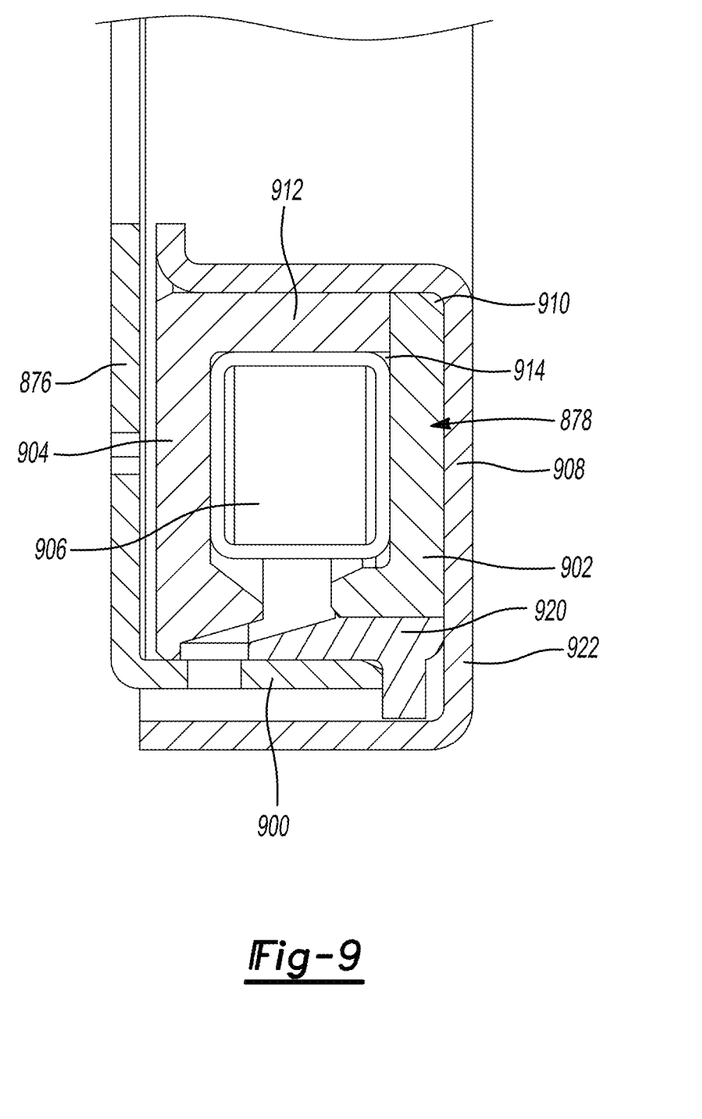
FIG. 9 is partial cross-sectional via of a coil assembly for the differential assembly of FIG. 8.

With reference to FIG. 9, the plunger 876 may be a cap-like structure having a rim member 900. The solenoid 878 generally includes an outer shell 902, an inner shell 904, and a coil 906 provided within a frame 908. When positioned in a recess 910 of the frame 908, the outer and inner shells 902 and 904 cooperate to form a core structure 912 that defines an annular coil aperture 914 that is sized to receive the coil 906. The armature 920 has an annular body and disposed within the frame 908 and is operable to move in an actuating direction opposite an end-wall 922 of the frame 908 to translate the plunger 876, which translates the thrust plate 862. It should be readily understood that the coil assembly 852 may be configured in various suitable ways. For example, a coil assembly may not include a plunger and instead directly translate the thrust plate.

With continuing reference to FIGS. 7-9, in operation, the control system 720 applies power to the solenoid 878 of the coil assembly to lock the gear set 716 of the differential assembly 628 via the coupling 850. More particularly, when the solenoid 878 (i.e., the coil) is energized, the electromagnetic field moves the armature 920 relative to the coil assembly 852 causing a change in inductance of the coil 906. The movement of the armature 920 translates the plunger 876 which translates the thrust plate 862, such that the leg members 872 urge the second dog ring 856 toward the first dog ring 854 such that the teeth 864 and 866 of the first and second dog rings 854 and 856 engage one another. As the second dog ring 856 is non-rotatably coupled to the differential case 712 and as the first dog ring 854 is rotatably coupled to the second side gear 804, engagement of the teeth 864 and 866 inhibits rotation of the second side gear 804 relative to the differential case 712, thereby locking the differential assembly 628 to inhibit speed differentiation between the axle shafts 704). To lock the gear set 716, the control system 720 provides power to the coil assembly 852 and measures the actuator frequency using the oscillator circuit with the coil 906 defining the inductor of the oscillator circuit. Based on the actuator frequency, the control system 720 determines a posture of the coupling 850 and may adjust power to the solenoid 878 based on the state. Accordingly, the EMA system 718 is configured to control the actuation of the coupling by monitoring the inductance of the coil assembly 852 and without the use of a discrete sensor.

It would be appreciated by one skilled in the art that, while the figures illustrate specific configuration of the differential assembly, the electromagnetic actuator system of the present application may be applicable to different types of differential assemblies and even to different application having a rotary gear system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "controller" may be replaced with the term "circuit". The controller may be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code may include software, firmware, and/or microcode, and may refer to programs, routines, functions, classes, data structures, and/or objects. The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory.

What is claimed is:

1. A vehicle driveline component comprising:
   an armature disposed along a translation axis, wherein the armature is moveable along the translation axis;
   a coil assembly having a coil;
   a coil driver electrically coupled to the coil, wherein the coil driver is operable to provide a modulating power signal to the coil to generate an electromagnetic field that causes relative motion between the coil assembly and the armature along the translation axis;
   an oscillator circuit having a resonant circuit, the oscillator circuit being electrically coupled to the coil of the coil assembly such that the coil defines a portion of the resonant circuit, wherein the oscillator circuit is configured to generate an oscillating signal having a frequency that varies based on a spacing between the armature and the coil assembly along the translation axis; and
   a controller coupled to the oscillator circuit and the coil driver, wherein the controller is configured to apply a drive signal to the coil driver to provide the modulating power signal to the coil assembly and to determine a system response characteristic related to the spacing between the armature and the coil assembly based on the oscillating signal;
   wherein the controller is configured to apply a measurement voltage to the oscillator circuit during a measurement interval to acquire the oscillating signal;
   wherein the modulating power signal having alternating powered and unpowered pulses is provided at a first frequency and the measurement interval is performed at a second frequency greater than the first frequency and taken during at least one of an unpowered pulse of the modulating power signal or when the modulating power signal is not provided to the coil; and
   wherein the controller is configured to determine a position or state of a torque-transmitting coupling based on a detected rate of change of inductance of the coil.

2. The vehicle driveline component of claim 1, wherein the system response characteristic is indicative of the inductance of the coil and includes the frequency of the oscillating signal that varies based on the inductance, the inductance of the coil, the detected rate of change of inductance, or a combination thereof.

3. The vehicle driveline component of claim 1, wherein the controller is configured to determine a position of the armature based on the system response characteristic and position correlation data that associates of one or more positions of the armature with a nominal system response characteristic for the one or more positions.

4. The vehicle driveline component of claim 1, wherein the controller is configured to change a duty cycle of the drive signal based on the determined system response characteristic.

5. The vehicle driveline component of claim 4, wherein:
   the controller is configured to increase the duty cycle of the drive signal to increase power to the coil in response to the system response characteristic indicating that the armature is at a first position relative to the coil assembly, and
   the controller is configured to decrease the duty cycle of the drive signal to decrease power to the coil assembly to a reduced power level in response to the system response characteristic indicating the armature is at a second position relative to the coil assembly, wherein with the reduced power level, the armature is maintained in the second position.

6. The vehicle driveline component of claim 1, wherein the oscillator circuit is a Colpitts oscillator.

7. The vehicle driveline component of claim 1 further comprising:
   a differential assembly including a differential input member and a pair of differential output members; and
   the coupling including a first coupling member and second coupling member, wherein the first coupling member is fixedly coupled to one of the differential output members for rotation therewith about the translation axis and the second coupling member is non-rotatably and axially slidably coupled the differential input member,
   wherein the second coupling member moves along the translation axis responsive to the relative motion between the coil assembly and the armature when the coil driver is operated to generate the electromagnetic field.

8. The vehicle driveline component of claim 7, wherein the coupling is a dog clutch.

9. The vehicle driveline component of claim 7, wherein:
   the system response characteristic is indicative of the inductance of the coil and includes the frequency of the oscillating signal that varies based on the inductance, the inductance of the coil, the detected rate of change of inductance, or a combination thereof, and
   the controller is configured to determine a position of the coupling based on the system response characteristic and position correlation data that correlates one or more positions of the coupling as it moves between an unlocked state and a locked state with a nominal system response characteristic.

10. The vehicle driveline component of claim 1, wherein the frequency of the oscillating signal is related to the inductance of the coil, and wherein the controller is configured to perform a diagnostic to determine an abnormal performance of the coupling, the coil assembly, the armature, or a combination thereof based on the system response characteristic and predefined diagnostic data, wherein the system response characteristic includes the frequency of the oscillating signal, the inductance of the coil, the detected rate of change of inductance, or a combination thereof.

11. The vehicle driveline component of claim 10, wherein the abnormal performance is associated with a temperature, lubrication characteristic, part alignment, or a combination thereof.

12. A method of controlling a vehicle driveline component having an armature disposed along a translation axis, a coil assembly including a coil, a coil driver electrically coupled to the coil, and an oscillator circuit, the method comprising:

provides, by way of the coil driver, a modulating power signal to the coil of the coil assembly to generate an electromagnetic field that causes relative motion between the coil assembly and the armature along the translation axis;

selectively applying a measurement voltage to the oscillator circuit connected to the coil of the coil assembly, wherein the oscillator circuit includes a resonant circuit and is electrically coupled to the coil of the coil assembly such that the coil defines a portion of the resonant circuit;

measuring a frequency of an oscillating signal generated by the oscillator circuit during a measurement interval, wherein the frequency of the oscillating signal is related to an inductance of the coil and varies based on a spacing between the armature and the coil assembly along the translation axis;

determining a system response characteristic related to the spacing between the armature and the coil assembly based on the oscillating signal;

determining whether a coupling in a vehicle driveline is locked based on the system response characteristic; and controlling power to the coil assembly based on the system response characteristic.

13. The method of claim 12, wherein the controlling power to the coil assembly further comprises:

increasing power to the coil in response to the system response characteristic indicating that the armature is at a first position relative to the coil assembly; and decreasing power to the coil in response to the system response characteristic indicating that the armature is at a second position relative to the coil assembly, wherein the decreased power maintains the armature in the second position.

14. The method of claim 12, wherein the system response characteristic is based on a measured characteristic, wherein the measured characteristic includes the frequency of the oscillating signal, the inductance of the coil, an inductance rate of change, or a combination thereof.

15. The method of claim 12, wherein the vehicle driveline component includes:

a differential assembly including a differential input member and a pair of differential output members; and the coupling including a first coupling member and second coupling member, wherein the first coupling member is fixedly coupled to one of the differential output members for rotation therewith about the translation axis and the second coupling member is non-rotatably and axially slidably coupled the differential input member, wherein the second coupling member moves along the translation axis responsive to the relative motion between the coil assembly and the armature when the modulating power signal is provided to the coil to generate the electromagnetic field, and wherein the method further comprises determining a state of the coupling as a locked state or an unlocked state based on the system response characteristic.

16. The method of claim 15, wherein:

the system response characteristic is based on a measured characteristic, wherein the measured characteristic includes the frequency of the oscillating signal, the inductance of the coil, an inductance rate of change, or a combination thereof, and the state of the coupling is determined based on predefined data that correlates one or more positions of the coupling as it moves between the unlocked state and the locked state with an associated measured frequency of the oscillating signal, an associated inductance of the coil, or an associated rate of change of inductance, or a combination thereof.

17. The method of claim 12 further comprising:

determining a measured characteristic, wherein the measured characteristic includes the frequency of the oscillator circuit, an inductance of the coil, an inductance rate of change, or a combination thereof; and performing a diagnostic to determine an abnormal performance of the coupling, the armature, the coil assembly, or a combination thereof based on a measured characteristic and diagnostic data, wherein the abnormal performance is associated with a temperature, lubrication characteristic, part alignment, or a combination thereof.

18. A vehicle driveline component comprising:

an armature disposed along a translation axis, wherein the armature is moveable along the translation axis;

a coil assembly having a coil;

a coil driver electrically coupled to the coil, wherein the coil driver is operable to provide a modulating power signal to the coil to generate an electromagnetic field that causes relative motion between the coil assembly and the armature along the translation axis;

an oscillator circuit having a resonant circuit, the oscillator circuit being electrically coupled to the coil of the coil assembly such that the coil defines a portion of the resonant circuit, wherein the oscillator circuit is configured to generate an oscillating signal having a frequency that varies based on a spacing between the armature and the coil assembly along the translation axis; and a controller coupled to the oscillator circuit and the coil driver, wherein the controller is configured to apply a drive signal to the coil driver to provide the modulating power signal to the coil assembly and to determine a position or state of a torque-transmitting coupling based on a detected rate of change of inductance of the coil.

* * * * *